US011358310B2

(12) United States Patent
Romanov et al.

(10) Patent No.: US 11,358,310 B2
(45) Date of Patent: Jun. 14, 2022

(54) METHOD AND DEVICE FOR PRODUCING A PARTICLE FOAM PART

(71) Applicant: Kurtz GmbH, Kreuzwertheim (DE)

(72) Inventors: Victor Romanov, Wertheim (DE); Stefan Ludwig, Karbach (DE); Norbert Reuber, Bergrothenfels (DE)

(73) Assignee: Kurtz GmbH, Kreuzwertheim (DE)

( * ) Notice: Subject to any disclaimer, the term of this patent is extended or adjusted under 35 U.S.C. 154(b) by 894 days.

(21) Appl. No.: 16/070,632

(22) PCT Filed: Jan. 18, 2017

(86) PCT No.: PCT/EP2017/050940
§ 371 (c)(1),
(2) Date: Jul. 17, 2018

(87) PCT Pub. No.: WO2017/125410
PCT Pub. Date: Jul. 27, 2017

(65) Prior Publication Data
US 2021/0206036 A1    Jul. 8, 2021

(30) Foreign Application Priority Data
Jan. 18, 2016   (DE) ............... 10 2016 100 690.4

(51) Int. Cl.
| B29C 44/58 | (2006.01) |
| B29C 44/44 | (2006.01) |
| B29C 44/34 | (2006.01) |
| B29C 35/08 | (2006.01) |
| B29K 75/00 | (2006.01) |

(52) U.S. Cl.
CPC ........ *B29C 44/445* (2013.01); *B29C 44/3426* (2013.01); *B29C 44/58* (2013.01); *B29C 35/0805* (2013.01); *B29C 44/3415* (2013.01); *B29C 2035/0861* (2013.01); *B29K 2023/06* (2013.01); *B29K 2075/00* (2013.01); *B29K 2867/003* (2013.01)

(58) Field of Classification Search
None
See application file for complete search history.

(56) References Cited

U.S. PATENT DOCUMENTS

| 3,015,851 A | 1/1962 | Wiles |
| 3,060,513 A | 10/1962 | Klink et al. |
| 3,242,238 A | 3/1966 | Edberg et al. |
| 3,331,899 A | 7/1967 | Immel |
| 4,851,167 A | 7/1989 | Marc |
| 5,082,436 A | 1/1992 | Choi et al. |
| 5,128,073 A | 7/1992 | Allen et al. |
| 5,139,407 A | 8/1992 | Kim et al. |
| 5,516,470 A | 5/1996 | Larsson |
| 5,973,308 A | 10/1999 | Sternowski |
| 6,241,929 B1 | 6/2001 | Akopyan |
| 6,358,459 B1 | 3/2002 | Ziegler et al. |
| 10,645,992 B2 | 5/2020 | Le et al. |
| 2009/0243158 A1 | 10/2009 | Plaksunov et al. |
| 2011/0068511 A1 | 3/2011 | Sowden et al. |
| 2011/0206926 A1 | 8/2011 | Marc |
| 2014/0243442 A1 | 8/2014 | Coles et al. |
| 2016/0039157 A1* | 2/2016 | Huang ............... B29C 65/3604 156/94 |
| 2016/0227876 A1 | 8/2016 | Le et al. |
| 2017/0095986 A1 | 4/2017 | Feigenblum et al. |

FOREIGN PATENT DOCUMENTS

| DE | 21 22 482 | 11/1971 |
| DE | 198 60 611 | 3/2000 |
| DE | 199 21 742 | 11/2000 |
| DE | 10117979 A1 | 8/2002 |
| DE | 102013012515 | 3/2014 |
| DE | 10 2014 207 580 | 10/2015 |
| DE | 10 2014 1 17 332 | 6/2016 |
| DE | 10 2015 202 013 | 8/2016 |
| EP | 1 990 170 | 11/2008 |
| GB | 1318230 | 5/1973 |
| GB | 1403326 | 8/1975 |
| JP | 2016-74106 A | 5/2016 |
| KR | 10 2014 0090995 | 7/2014 |
| WO | WO 0164414 | 9/2001 |
| WO | WO 2004103687 | 12/2004 |
| WO | WO 2013005081 | 1/2013 |
| WO | WO 2014128214 | 8/2014 |

OTHER PUBLICATIONS

International Search Report of the International Searching Authority, dated Apr. 25, 2017, from International Application No. PCT/EP2017/050940, filed on Jan. 18, 2017. 12 pages.
Written Opinion of the International Searching Authority, dated Apr. 25, 2017, from International Application No. PCT/EP2017/050940, filed jn Jan. 18, 2017. 8 pages.
Search Report of German Patent Application No. 10 2016 100 690.4 dated Apr. 28, 2016 filed Jan. 18, 2016.
Examination Report of German Patent Application No. 10 2016 100 690.4 dated Jun. 19, 2019 filed Jan. 18, 2016.
Examination Report dated Feb. 26, 2020 from EP 17700954.5, filed on Jan. 18, 2017. 11 pages.
International Preliminary Report on Patentability, dated Jul. 24, 2018, from International Application No. PCT/EP2017/050940, filed on Jan. 18, 2017. 17 pages.
International Preliminary Report on Patentability, dated Jul. 24, 2018, from International Application No. PCT/EP2017/050943, filed on Jan. 18, 2017. 15 pages.

(Continued)

*Primary Examiner* — Jacob T Minskey
*Assistant Examiner* — Adrien J Bernard
(74) *Attorney, Agent, or Firm* — HoustonHogle LLP

(57) ABSTRACT

This invention concerns a process for producing particle foam part in which foam particles are heated in a molding tool so that they weld to the particle foam part. Heat is supplied to the foam particles by means of electromagnetic RF radiation. The foam particles are made of polyurethane (PU), polylactate (PLA), polyethylene block amide (PEBA) or polyethylene terephthalate (PET).

24 Claims, 13 Drawing Sheets

(56) References Cited

OTHER PUBLICATIONS

Figure 1:
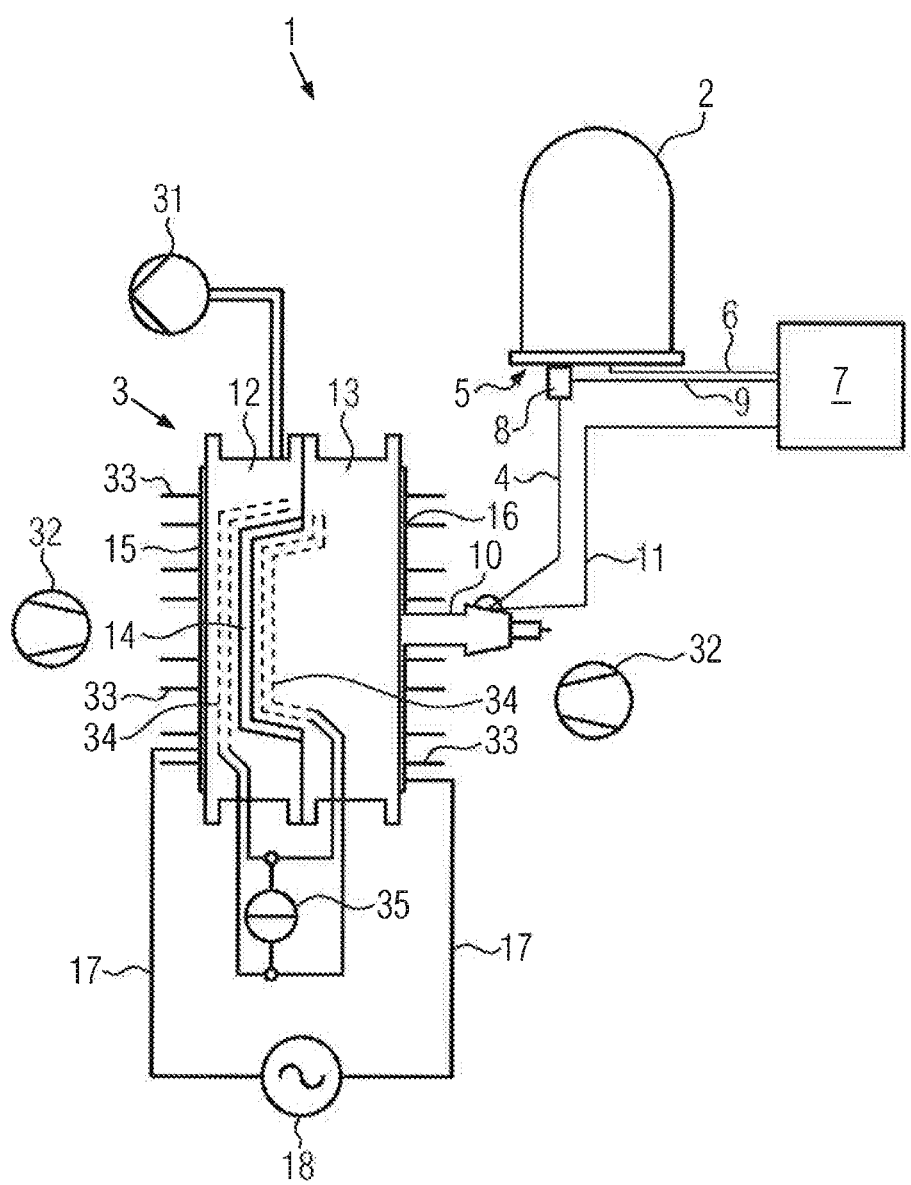
Figure 2:
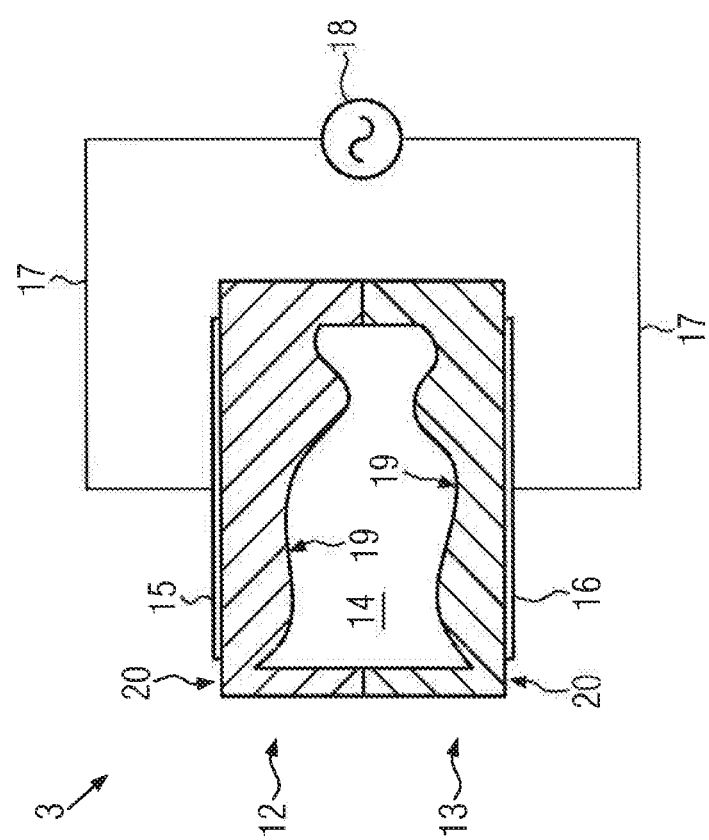

International Search Report of the International Searching Authority, dated Apr. 24, 2017, from International Application No. PCT/EP2017/050943, filed on Jan. 18, 2017. 7 pages.
Notification of First Office Action dated Dec. 13, 2019 of Chinese Patent Application No. 201780007213.9, filed Jan. 18, 2017. 19 pages.
Notification of First Office Action dated Jan. 22, 2020 of Chinese Patent Application No. 201780007212.4, filed Jan. 18, 2017.
Notification of Office Action dated Jan. 29, 2021 of Chinese Patent Application No. 201780007212.4, filed Jan. 18, 2017. 12 pages.
Written Opinion of the International Searching Authority, dated Apr. 24, 2017, from International Application No. PCT/EP2017/050943, filed on Jan. 18, 2017. 14 pages.

\* cited by examiner

METHOD AND DEVICE FOR PRODUCING A PARTICLE FOAM PART

RELATED APPLICATIONS

This application is a § 371 National Phase Application of International Application No. PCT/EP2017/050940, filed on Jan. 18, 2017, now International Publication No. WO 2017/125410, published on Jul. 27, 2017, which International Application claims priority to German Application 10 2016 100 690.4, filed on Jan. 18, 2016, both of which are incorporated herein by reference in their entirety.

The present invention relates to a method and a device for producing a particle foam part.

WO 2013/05081 Al and/or US 2014/0243442 A1 discloses a process for producing particle foam parts, wherein a mixture of foam particles and dielectric transfer liquid is heated by means of electromagnetic waves to fuse the foam particles into a particle foam part. Radio waves or microwaves are used as electromagnetic waves. The material of the foam particles is made of polypropylene (PP).

The U.S. Pat. No. 3,060,513 describes a process for sintering moist thermoplastic foam particles. The particles are dielectrically heated and simultaneously compressed in the molding tool. Electromagnetic waves are applied at a frequency of about 2 to 1000 MHz.

A similar process is described in U.S. Pat. No. 3,242,238, wherein foam particles are moistened with an aqueous solution and exposed to an electromagnetic field with a frequency of about 5 to 100 MHz.

GB 1,403,326 describes a process for welding expandable polystyrene foam particles, wherein the particles are moistened with an aqueous solution and exposed to an electromagnetic field of 5 to 2000 MHz.

WO 01/64414 A1 discloses another process wherein polymer particles of polyolefins wetted with a liquid medium are heated with electromagnetic waves, particularly microwaves. The temperature in the molding tool is controlled by controlling the pressure inside.

In the processes described above, moist foam particles are treated with electromagnetic waves, the electromagnetic energy being absorbed by the liquid and transferred to the particles.

U.S. Pat. No. 5,128,073 produces thermoplastic particles coated with a high-frequency energy absorbing material. These particles can be heated with electromagnetic waves, wherein the coating gives up the electromagnetic energy and releases it onto the foam particles. Electromagnetic waves in the range from 40 MHz to 2450 MHz are used to weld the foam particles.

US 2009/0,243,158 A1 discloses a process wherein foam particles are welded by microwaves with the addition of water, wherein the water is heated by the microwave and the heat is transferred to the foam particles. The temperature is controlled by adjusting the pressure of the steam in the molding tool.

Although these processes have been known for decades, they have not been able to establish themselves in practice. There are many different reasons for this. A major problem with this process is the transfer of heat from the aqueous solution to the foam particles, as it is not always uniform. This prevents uniform welding in the particle foam part. In addition, so much moisture is usually necessary to absorb sufficient electromagnetic waves that the finished particle foam part often contains too much residual moisture, which impairs the quality of the particle foam part.

In practice, therefore, foam particles are almost exclusively welded using saturated dry steam, as is known from WO 2014/128214 A1, for example. Compared to welding with steam, welding with electromagnetic waves has never been able to establish itself in practice, although the welding of electromagnetic waves would have considerable advantages due to the principle. With electromagnetic waves, the energy could be transmitted much more precisely, so that it would not be necessary to heat auxiliary bodies. When steam is used, it must first be generated in a steam generator. Then the steam must be fed to the tool via pipes.

All these parts must be heated to a sufficiently high temperature so that the steam does not condense in them. This causes a considerable heat loss. In addition, the devices for steam generation and steam line occupy most of the space on the device for producing the particle foam part. If no steam was required to weld the foam particles, the entire device could be made much more compact.

DE 199 21 742 A1 concerns a process for foaming plastics using electromagnetic waves. Conductive particles, especially graphite, can be added to the polymer material.

DE 21 22 482 A is another process for foaming polymers using electromagnetic waves.

Polyurethane is used here as the polymer material. The high-frequency electrical energy can be supplied to the polymer material by microwaves and/or RF radiation.

The object of the invention is to create a method and devices for producing a particle foam part, with which expandable thermoplastic foam particles can be welded efficiently and reliably.

The object is achieved according to the invention by the subject matter of the independent claims. Advantageous embodiments are indicated in the following description.

In the inventive process of producing a particle foam part, foam particles are heated in a molding tool so that they weld to the particle foam part. Heat is supplied to the foam particles by means of electromagnetic RF radiation. The foam particles are made of polyurethane (PU), polylactate (PLA), polyethylene block amide (PEBA) or polyethylene terephthalate (PET).

The foam particles consist mainly of polyurethane, polylactate (PLA), polyethylene block amide (PEBA), polyethylene terephthalate or a mixture of these materials. Preferably, 90% by weight of the foam particles consists of one or a mixture of these materials.

The inventors of this invention have found out that these materials absorb RF electromagnetic radiation well, so that unlike conventional methods, no dielectric heat transfer medium is required. Since the electromagnetic RF radiation is directly absorbed by the foam particles and converted into heat, a very targeted and uniform heat input is achieved. The foam particles are heated evenly so that a homogeneous weld is achieved in the particle foam part.

With this invention, the foam particles are heated primarily by direct absorption of RF radiation. This means that the heat is not or only to a small extent heated by a heat-transferring medium, such as water, which absorbs the RF radiation and releases it to the foam particles. The direct absorption of RF radiation is very efficient and also allows the welding of foam particles consisting of materials such as polyethylene terephthalate (PET) whose softening temperature is above 200° C. (usually 260° C.), which is not possible by heating with an aqueous heat transfer medium. In addition, the use of such heat transfer agents, which can disturb the quality of the end product, is avoided or reduced.

As explained in more detail below, additional devices and means, such as heat transfer agents, can be provided at the edge area of the particle foam parts to additionally heat the edge area of the particle foam parts. The individual foam particles are very good thermal insulators, which is why there is often a considerable temperature difference between the inside of the particle foam part and the inner surface of the molding tool when welding individual foam particles in the molding tool.

The temperature difference generally only extends over the outermost layer or over the two outermost layers of the foam particles. It may therefore be advisable to heat this edge area of the particle foam parts additionally.

Apart from this edge area, which consists of one, two or a few layers of foam particles, the particle foam part is heated by direct absorption of the electromagnetic RF radiation through the foam particles.

Electromagnetic RF radiation preferably has a frequency of at least 30 KHz or at least 0.1 MHz, in particular at least 1 MHz or at least 2 MHz preferably at least 10 MHz.

Electromagnetic RF radiation preferably has a maximum frequency of 300 MHz. The foam particles can consist of a uniform material or homogeneous material.

The foam particles can be compressed in the molding tool. In that case compression means that the foam particles are mechanically compressed without the effect of thermal expansion that occurs in the molding tool due to the heating required for welding. The foam particles can be compressed, for example, by filling the molding tool with foam particles under pressure or counterpressure. Compression can also be achieved by compressing two molding halves already filled with foam particles. Such molding tools, which have compressible molding halves when filled, are called cracking gap molds.

The temperature of the foam particles in the molding tool is preferably measured. The supply of heat by means of electromagnetic RF radiation can be controlled as a function of the measured temperature. The temperature measurement can be carried out by means of electrical temperature sensors as well as fiber-optic temperature sensors.

The surface of the tool defining the molding post can be tempered. Depending on the size of the particle foam part to be produced and depending on the plastic material used, different temperatures can be set. The molding tool is preferably tempered to a temperature in the range of about 50° C. to about 150° C.

After welding the foam particles to the particle foam part, it can be stabilized. Stabilization is achieved by holding the particle foam part in the tool, whereby the molding tool is not opened and the shape of the molding post is maintained unchanged.

During stabilization, the heat can be evenly distributed within the particle foam part and the particle foam part can also cool down slowly.

Preferably a vacuum is applied to the molding tool before, during and/or after welding. This mainly removes moisture from the molding post and the plastic material to be welded.

The molding tool is preferably made of a material that is essentially transparent to the electromagnetic RF radiation used, such as polytetrafluoroethylene (PTFE), polyethylene, particularly UHMWPE, polyetherketone (PEEK) and other materials transparent to RF radiation.

Two or more capacitor plates are provided for generating the electromagnetic RF radiation, which are arranged on a molding tool otherwise made of an electrically insulating material. A high-frequency voltage with an amplitude of at least 1 kV, preferably at least 10 kV and in particular at least 20 kV is applied to the capacitor plates.

The molding tool can have different thicknesses in the area between the respective capacitor plates, so that the molding chamber is limited by three-dimensional contoured inner delimiting surfaces. This makes it possible to produce three-dimensionally contoured particle foam parts. A three-dimensional contoured delimiting surface is a surface that is not a flat surface. Such a molding tool design is particularly advantageous for producing particle foam parts, which have essentially the same density of foam particles everywhere.

The molding tool may have means for tempering the molding tool in the region of an inner delimiting surface defining the molding chamber and/or for supplying a heating medium to the region of the particle foam part adjacent the inner delimiting surface. This means that heat is added to the area on the surface of the particle foam part when producing a particle foam part.

It has been shown that if no additional heat is supplied to the surface area, this area is heated more slowly than the central area of the particle foam part, which can lead to uneven welds. This design of the molding tool counteracts such uneven welding.

According to a preferred design, the molding tool has a porous molded body that forms at least a portion of the inner delimiting surface and communicates with a device for supplying a heating fluid. Hot steam is used as heating fluid, for example. By supplying hot steam in the porous molded body, the porous molded body itself is tempered and steam can penetrate through the pores of the porous molded body into the mold space and heat the surface area of the foam part to be produced with the molding tool.

The porous shaped body is designed in such a way that the heated fluid can evenly escape over the area of the shaped body. However, the flow cross-section formed through the pores of the molded body is much smaller than with conventional molding tools, with which the foam particles are heated exclusively with steam. This porous shaped body serves only for the superficial supply of heat to the particle foam part.

The molding tool can have at least one channel for feeding or passing through a heating fluid. This allows the molding tool itself to be tempered. However, the channel can also be connected to openings opening into the molding chamber, as in the porous molded body described above, so that the heating fluid enters the mold chamber. It is preferred when a great many of openings are provided, which are distributed over the delimiting surface, so that even with a low flow of the heating fluid a uniform heating of the surface of the particle foam part takes place.

With the designs described above, vapor, especially steam, can be fed into the molding chamber. The water fed into the molding chamber can also absorb the RF radiation and convert it into heat. However, the amount of heating fluid supplied is preferably so small that the foam particles are heated primarily by the direct absorption of RF radiation. Preferably, the amount of heat supplied through the direct absorption of RF radiation is at least 50% of the total heat quantity, preferably at least 75% of the total heat quantity supplied to the molding chamber and in particular at least 90% of the total heat quantity supplied to the molding chamber.

Another way of tempering the inner delimiting surface of the molding tool is to provide the inner delimiting surface with a layer of a material that is not transparent to RF radiation. This layer is called a passive heating layer. The passive heating layer can be made of a temperature-stable material that is not transparent to RF radiation. Suitable materials are corresponding plastics or ferrites.

For tempering the inner delimiting surface of the molding tool, an electric heating device can be arranged alternatively or additionally adjacent to the inner delimiting surface of the molding tool in the molding tool. The electric heating device preferably has one or more heating wires which are arranged adjacent to the inner delimiting surface of the molding tool. The heating wires can be arranged in zigzag or wavy lines so that a flat area of the delimiting surface can be heated with a single heating wire. The heating wire(s) are connected to a power source with which a current can be applied to heat the heating wires.

The heating wires can also be used to measure the temperature of the molding tool in the region of the inner surface. For this, preferably a heating wire is used, whose electrical resistance changes strongly in the temperature range of 60 to 250° C. relevant here.

During the application of the RF radiation, the heating wire(s) is/are separated from the power source as far as possible so that no uncontrolled currents can flow through the RF radiation in the circuit closed by the power source. The RF radiation can nevertheless cause an alternating charge shift in the heating wire(s), which causes a certain heating of the heating wires. This must be taken into consideration when tempering the molding chamber. Preferably the heating wire(s) is (are) in equipotential areas of the RF radiation, whereby no currents are induced in the heating wires. These equipotential surfaces generally run parallel to the capacitor plates.

With the additional heating of the edge area of the particle foam parts it can be ensured that the particle foam part in the region of the surface is reliably welded by the additional heating.

By additionally heating the inner delimiting surface of the molding tool, it is also possible to heat the molding tool to a predetermined, reproducible starting temperature before the actual welding or sintering process, so that the production of each particle foam part begins at the same temperature as the inner delimiting surface of the molding tool. Due to this the production process of the particle foam parts can be considerably stabilized. If the molding tool has already been heated from welding or sintering processes carried out immediately before, then no or only a small preheating is necessary, whereas a molding tool at room temperature must first be heated to the starting temperature. The start temperature is typically in the range of 10° C. to 50° C. below the softening temperature of the material to be welded.

Such skin formation can also be produced alternatively by inserting a film into the molding tool, whereby the film is fused with the particle foam part and forms a layer bounding the surface. The film has a higher density than the foam particles, which means that the film absorbs more electromagnetic RF radiation than the foam particles. This causes the film to heat up more strongly and fuses with the outer foam particles of the particle foam part. The film is preferably made of the same material as the foam particles or a material that has a similar softening temperature as the material of the foam particles.

The capacitor plates of the molding tool can be adapted to the contour of the inner delimiting surfaces of the molding tool. The distance between the capacitor plates facing each other is preferably about the same everywhere.

By adapting the capacitor plates to the contour of the inner delimiting surfaces of the molding tool, the distance between the two capacitor plates can be kept small, although particle foam parts are formed which are three-dimensionally contoured and can extend considerably in all three spatial directions. This applies in particular to shell-shaped bodies, such as boxes, spherical segment shells and the like.

The capacitor plates may have a three-dimensional contoured shape, wherein a portion of the capacitor plates facing an area of the cavity in which, in use, the foam particles are more densified than in another area further away from the cavity than a portion of the capacitor plates facing an area of the cavity in which the foam particles are less compressed. It has been shown that the denser the foam particles are compressed in the molding chamber, the more energy they absorb. This can cause different heating. This is counteracted by shaping the electromagnetic field by adjusting the distance between different sections of the capacitor plates so that the electromagnetic field has a lower intensity in the region of higher compression of foam particles than in a region with lower compression of the foam particles.

The capacitor plates can be one-piece and three-dimensionally contoured. However, the capacitor plates can also consist of several segments. The several segments can be adjusted independently of each other in the distance to the molding chamber. This setting can be repeated, whereby corresponding fixing elements are provided for fixing the position of the sections of the capacitor plates. The adjustment can also be made once, whereby the sections of the capacitor plates or elements arranged on them, e.g. rods, are cast into a plastic body.

The capacitor plates can also be used for targeted cooling of the molding tool after the production of a particle foam part. Preferably, the capacitor plates have cooling elements. The cooling elements can be cooling fins, which are actively supplied with cooling air by a fan. The cooling elements can alternatively or additionally be cooling lines which are coupled to the condenser plates. A cooling medium, such as water or oil, is passed through the cooling lines to cool the condenser plates if necessary.

The capacitor plates can also be automatically brought into contact with the bodies of the molding tool using an adjusting device, so that the heat contained in the bodies of the molding tool is dissipated via the capacitor plates. During heating, the capacitor plates can be lifted from these bodies to prevent unwanted cooling of the molding bodies.

Cooling of the tool by means of the capacitor plates can be controlled by measuring the temperature of the molding tool in a closed control loop. The heating wire explained above can be used as temperature sensor.

For a better understanding of the invention, its operating advantages and specific objects attained by its uses, reference is made to the accompanying drawings and descriptive matter in which preferred embodiments of the invention are illustrated. The drawing shows in:

FIG. 1 schematically an example of a device for producing a particle foam part

FIGS. 2 to 6 schematically different tools for a device for producing a particle foam part in a cross-sectional view, FIGS. 7a to 7k each contain a particle foam part which can be produced by welding with a RF radiation.

A device 1 for producing a particle foam part comprises a material container 2, a molding tool 3 and a line 4 leading from the material container 2 to the molding tool 3.

The material container 2 serves to hold loose foam particles. The material container 2 has a bottom 5, whereby it is connected to a compressed air source 7 via a compressed air line 6 in the bottom area. The compressed air line 6 is connected to several nozzles arranged in the bottom 5 (not shown), so that several air streams (fluidizing air) can be introduced into the material container 2, which swirl the foam particles contained therein and thereby separate them.

In the region of the bottom 5 of the material container 2 there is an opening to which the delivery line 4 is connected. The opening can be closed with a slide (not shown).

Adjacent to the material container there is a jet nozzle 8 in delivery line 4. The propelling nozzle 8 is connected to the compressed air source 7 by another compressed air line 9. Compressed air supplied to this propelling nozzle 8 serves as propelling air, as it enters the delivery line 4 through the propelling nozzle 8 and flows in the direction of the molding tool 3. This creates a vacuum at the blowing nozzle 8 on the side facing the material container 2, which sucks foam particles from the material container.

Delivery line 4 flows into a filling injector 10, which is coupled to molding tool 3. The filling injector 10 is connected to compressed air source 7 via another compressed air line 11. The compressed air supplied to the filling injector 10 is used on the one hand to fill the molding tool 3 by applying the flow of foam particles by means of the compressed air in the direction of the molding tool 3. On the other hand, the compressed air supplied to the injector 10 can also be used to blow back the foam particles from the delivery line 4 into the material container 2 when the filling process at the molding tool 3 is completed.

Molding tool 3 consists of two molding halves 12, 13. Between the two molding halves at least one molding chamber 14 is limited in which the filling injector 10 opens for the introduction of the foam particles. The volume of the molding chamber 14 can be reduced by closing the two molding halves 12, 13. When molding halves 12, 13 are moved apart, a gap is formed between the molding halves 12, 13, which is referred to as the crack gap. For this reason, such a molding tool 3 is also called a crack-gap molding tool.

Device 1 has no steam generator and no steam supply to the molding chamber 14 as it is usual with conventional devices for producing particle foam parts. Moisture in molding chamber 14 comes solely from the residual moisture contained in the material of the foam particles and from the moisture contained in the compressed air. No water or steam is added to the foam particles in material container 2 or during transport to molding chamber 14.

A capacitor plate 15, 16 is arranged at each of the molding halves 12, 13. These capacitor plates each consist of a well electrically conductive material, e.g. copper. The filling injector 10 is arranged on the molding half 13. The filling injector 10 extends through a recess in the capacitor plate 16, which is mounted on the molding half 13.

The capacitor plates 15, 16 are connected to an AC voltage source 18 via electrical lines 17 for the transmission of high-frequency voltages.

The molding halves 12, 13 each have a base body which is made of an electrically non-conductive and particularly for electromagnetic RF radiation 35 transparent material, such as polytetra-fluoroethylene (PTFE), polyethylene, particularly UHMWPE, polyether-ketone (PEEK). Only the capacitor plates 15, 16 are electrically conductive.

The molding tool can optionally be connected to a vacuum pump 31, so that a negative pressure or vacuum can be applied to the molding chamber 14. This negative pressure causes the moisture contained in the molding chamber 14 to be removed.

The capacitor plates 15, 16 are preferably equipped with a cooling device. In the present design example, the cooling device is formed by fans 32, which direct cooling air to the side of the capacitor plates 15, 16 facing away from the molding chamber 14. For increasing the cooling effect, cooling fins 33 are provided on the capacitor plates 15, 16.

Alternatively, or additionally, cooling lines can also be arranged at the capacitor plates 15, 16, through which a cooling medium is passed. The preferred cooling medium is a liquid, e.g. water or oil.

In the following, a process for producing particle foam parts with the device described above is explained:

The method comprises the following steps:
Filling the molding chamber 14
Welding of the foam particles
Stabilization (optional)
Demolding
Cleaning of the tool (optional)

To fill the molding chamber 14, air is blown in via the compressed air line 6 in the region of the bottom 5 of the material container to swirl and separate the foam particles contained therein. At the same time propelling air is fed to the propelling nozzle so that 2 foam particles are sucked from the material container into the conveying line 4 and transported with the propelling air in the direction of the molding tool 3. Molding chamber 14 is closed, whereby molding halves 12, 13 can be fully collapsed or spaced apart by a crack gap.

The slide of material container 2 can be opened and closed in succession. Opening and shutter speeds typically range from 500 ms to 1 s. By this cyclic opening and closing of the slider, the foam particles are fed intermittently from the material container 2 to the delivery line 4. This can break up bridging of the foam particles in material container 2 and the foam particles are separated. This is particularly useful for foam particles with an adhesive surface, such as eTPU foam particles.

Alternatively, intermittent suction can also take place by an intermittent supply of the propelling air from the compressed air line 9 at the propelling nozzle 8 arranged directly adjacent to the material container 2.

Molding tool 12, 13 is equipped with at least one valve (not shown) which is open when foam particles are fed so that the compressed air flowing into molding chamber 14 can escape. When filling the molding chamber 14, this valve can be adjusted such that a counter pressure forms in the molding chamber 14.

This allows the pressure in the delivery line and in the molding chamber 14 to be maintained, which keeps the foam particles at a small volume. This allows more foam particles to be fed into the molding chamber 14 than would be possible without applying counterpressure.

After reducing the back pressure expands the foam particles in the molding chamber 14. Another parameter for setting the filling quantity is the crack gap, i.e. the gap with which the two molding halves 12, 13 are spaced apart during filling. The use of a crack gap during filling mainly increases the density in the thin area of the particle foam part to be produced.

As soon as it is determined that the molding chamber 14 is filled with foam particles, the filling injector 10 is closed. The foam particles in the line are blown back into the material container 2 with the compressed air supplied to the filling injector 10.

The filling of molding chamber 14 with foam particles is described in detail in the German patent application DE 10 2014 1 17 332, which is why reference is made to this patent application.

After filling the molding chamber 14 with foam particles, these are heated by electromagnetic RF radiation. This RF radiation is generated by applying a high-frequency voltage of about $10^4$V with a frequency of 27.12 MHz to the capacitor plates 15, 16.

The foam particles are based on polyurethane (eTPU). Polyurethane has a dielectric loss factor D of 0.2 with electromagnetic radiation at a frequency of 1 MHz. The dielectric loss factor of polypropylene (PP) at an electromagnetic radiation with a frequency of 1 MHz is only 0.00035. The absorbency of polyurethane is therefore much higher than that of polypropylene.

This makes it possible, without additional heat transferring substances, particularly aqueous solutions, to introduce the necessary heat for welding the foam particles in the molding chamber 14, since the foam particles themselves absorb the electromagnetic waves.

In place of foam particles based on polyurethane, foam particles based on polyethylene block amide (PEBA) or based on polyethylene (PE) can also be used.

The duration over which the electromagnetic RF radiation is applied depends on the volume of molding chamber 14, on the density of the foam particles and on the applied electrical power or voltage.

Tests have shown that, depending on the volume and the material from which the foam particles are formed, it takes about 30 s to about 2 min to weld the foam particles reliably and completely. An electrical voltage of 5 kV to 20 kV was applied in that case.

Preferably the temperature of the foam particles is measured during welding and the electrical power is regulated accordingly. The electrical power is preferably controlled so that the foam particles have a temperature slightly above their softening temperature.

The surface delimited by the molding chamber 14 can also be tempered. For this purpose, heating wires 34 can be arranged in the molding tool adjacent to the surface delimiting the molding chamber 14. The heating wires 34 are connected to a power source 35, with which a heating current can be fed into the heating wires.

Instead of heating wires, fluid channels can also be provided in the molding halves 12, 13 through which flows an appropriate temperature-controlled fluid. Preferably the fluid is water or steam.

After the application of the electromagnetic RF radiation, the molding chamber 14 is kept closed for a predetermined time, whereby the heat introduced is distributed evenly in the particle foam part and a very uniform weld is formed between all foam particles.

This process step is called stabilization. During stabilization, the particle foam part also cools slightly. Since the molding halves 12, 13 are made of a material that is essentially transparent to electromagnetic RF radiation and is usually a plastic material that conducts heat poorly, little heat is generally given off to the outside in closed molding chamber 14.

Molding halves 12, 13 made of plastic have the advantage over molding halves made of metal that they insulate much better thermally and have a lower heat capacity. This allows the desired temperature cycles to be carried out much faster and with less energy, whereby the supplied heat is fed almost completely to the foam particles.

During the stabilization period or part of the stabilization period, the capacitor plates 15, 16 can be actively cooled by the cooling device 32, 33, whereby heat is extracted from the basic bodies of the molding halves 12, 13 and thus also from the particle foam part.

After stabilization, the particle foam part is demolded by moving the two molding halves 12, 13 apart. The molding tools can be provided with demolding rods for demolding with which the particle foam part is pushed out of one of the two molding halves 12, 13.

Stabilization is an optional process step. It can also be omitted for certain materials and shapes. The larger the volume of the particle foam part to be produced, the more expedient it is to stabilize the particle foam part in the mold after welding.

Electromagnetic RF radiation can be applied during the filling and/or closing of a crack gap to increase throughput.

The RF radiation can be applied during filling or only after filling the molding chamber 14 with foam particles, initially with low electrical power or low electrical voltage, to preheat the material to a certain temperature and then gradually or abruptly increase the electrical power or voltage.

It may also make sense to gradually increase the power or voltage of RF electromagnetic radiation so that a ramp is executed over a period of, for example, 30 seconds to 3 minutes by the gradual increase in the electrical power or voltage of RF electromagnetic radiation. This results in a very uniform heating of the foam particles.

Optionally, a negative pressure and/or vacuum can be applied to the molding chamber 14. This is useful if the foam particles and/or the supplied compressed air have a certain humidity.

The method described above is a dry process compared to steam welding. This ensures that the produced particle foam parts are dry after the production process and can be immediately added to further processing steps. It may also be advisable to remove the warm particle foam parts from the molding tool and feed them directly for further processing. For example, when manufacturing shoes, a midsole made of a particle foam part can be welded to a profile body made of another plastic material, whereby not as much energy is required to weld to the still warm or still hot particle foam part as would be the case with a steam process in which the particle foam part must be completely cooled and dried. As a result, substantial increases in efficiency can be achieved in production, since on the one hand the breaks between individual process steps can be shortened, on the other hand, the heat introduced for welding the foam particles can also be used at least in part for subsequent process steps.

In the following, different tools are explained which each have two molding halves 12, 13 and can be used in the device 1 described above.

These tools are schematically simplified in FIGS. 2 to 6. The filling injector 10, thermometer for measuring the temperature in the molding chamber and other mechanical parts, such as holding elements, movement devices and the like for opening and closing the tool are omitted for easier graphic representation.

Molding tool 3 according to a second design example (FIG. 2) is formed from two molding halves 12, 13, each of which has a base body which consists of an electrically non-conductive material which is transparent particularly to electromagnetic RF radiation. This material is PTFE, PE, PEEK or any other material transparent to RF radiation. The molding halves 12, 13 define a molding chamber 14. In this design example, the molding chamber 14 has delimiting surfaces 19, which have a different, contoured shape from a flat surface.

The molding halves 12, 13 each have a flat outside surface 20 on which a capacitor plate 15, 16 is arranged. The space between the contoured delimiting surfaces 19 and the outside surfaces 20 is filled by the transparent material. The capacitor plates 15, 16 are flat. With this molding tool 3 three-dimensional contoured particle foam parts can be produced, whereby the shape of the particle foam part is defined by the inner delimiting surfaces 19 of the molding halves 12, 13. Such a molding tool 3 is particularly suitable for producing small particle foam parts with essentially uniform density.

Figure 7A:
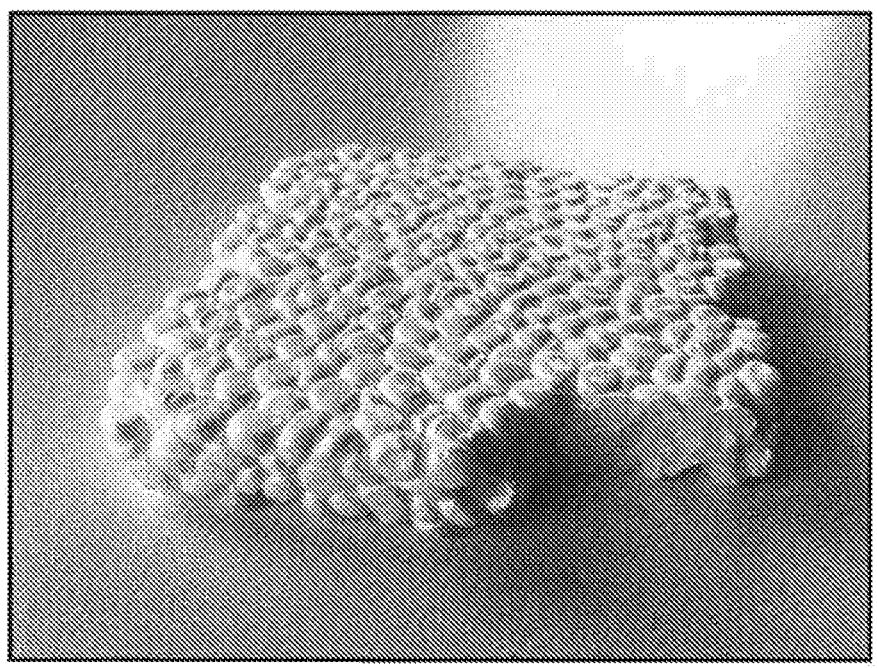
Figure 7B:
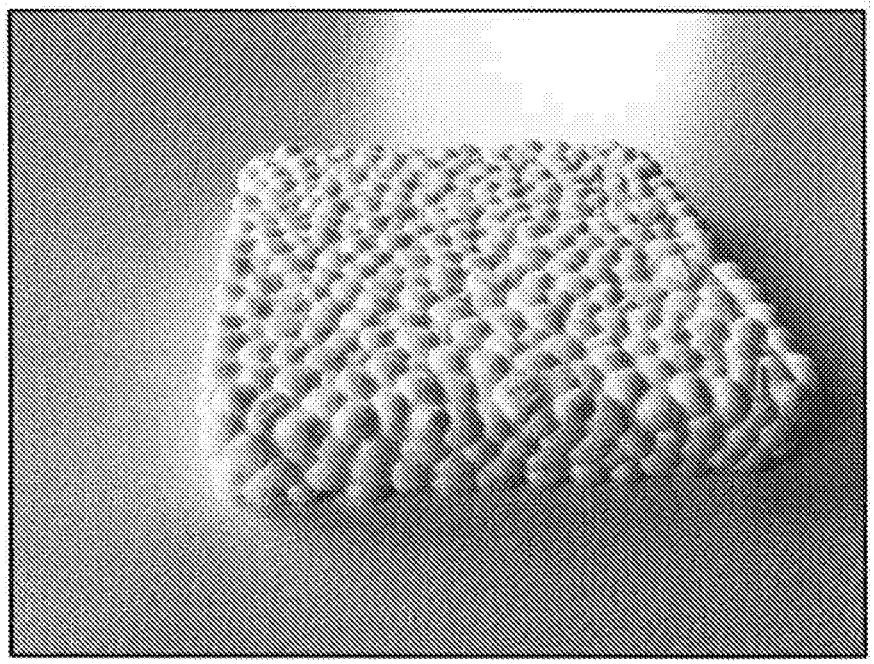
Figure 7C:
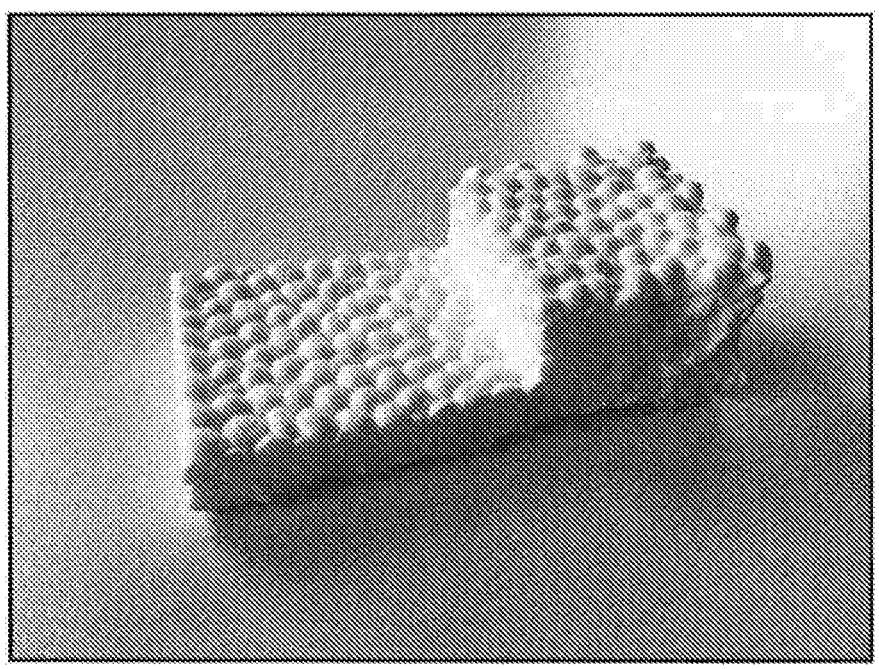
Figure 7D:
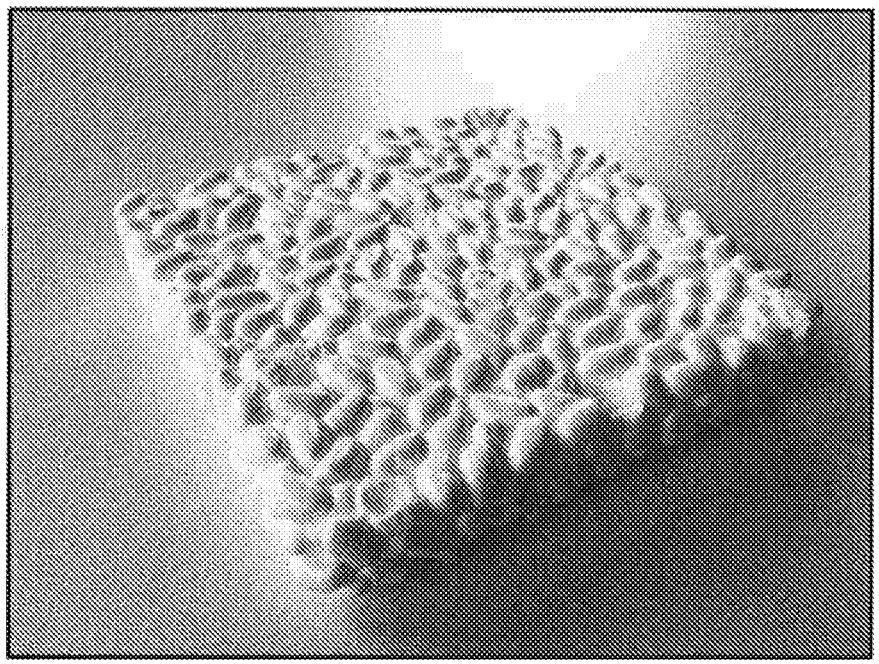
Figure 7E:
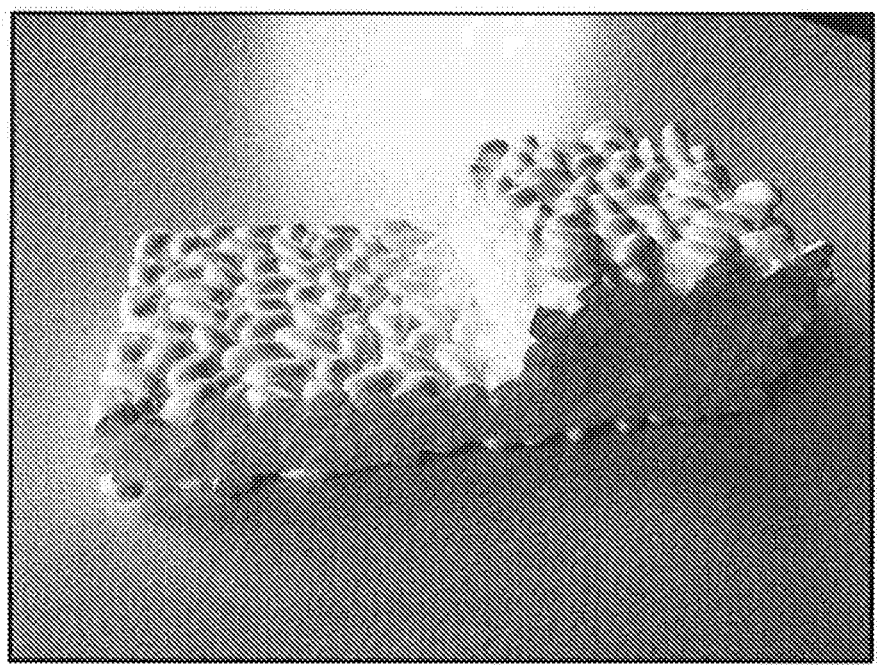
Figure 7F:
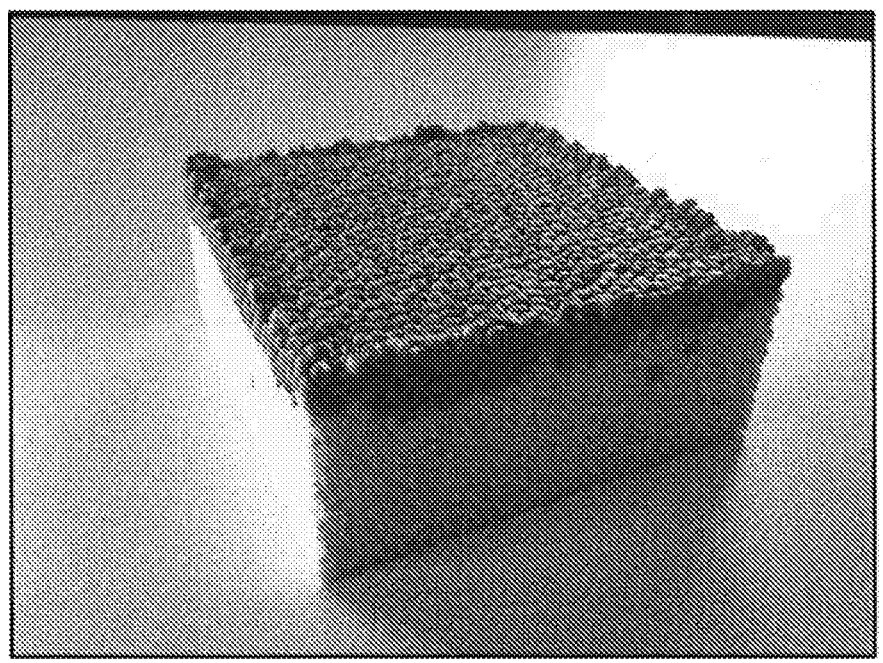
Figure 7G:
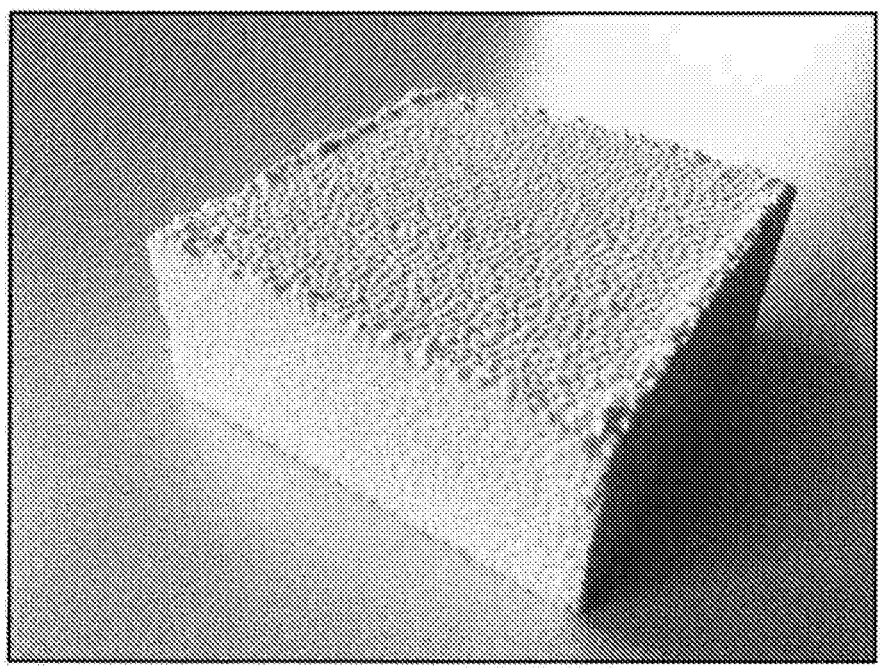
Figure 7H:
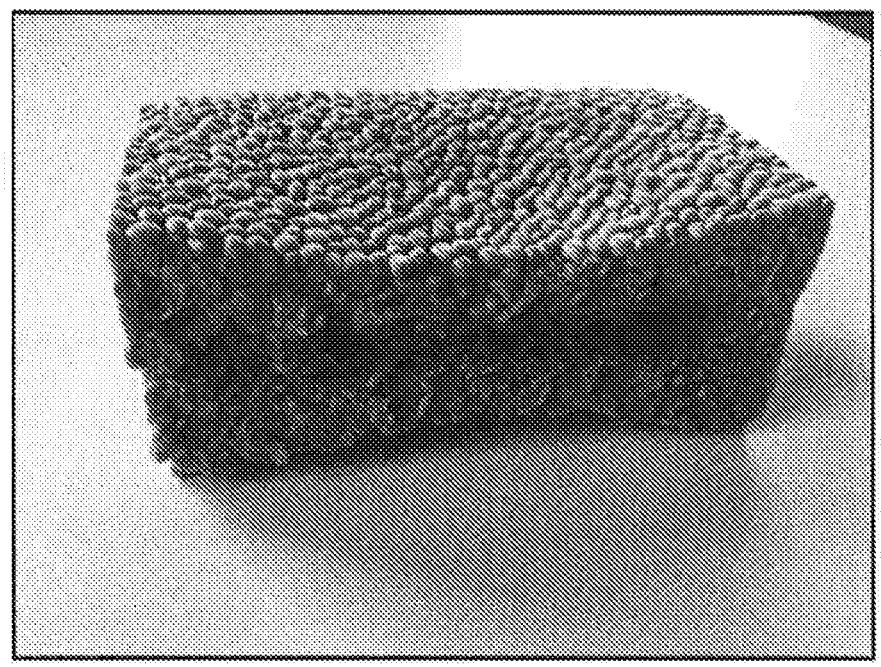
Figure 7I:
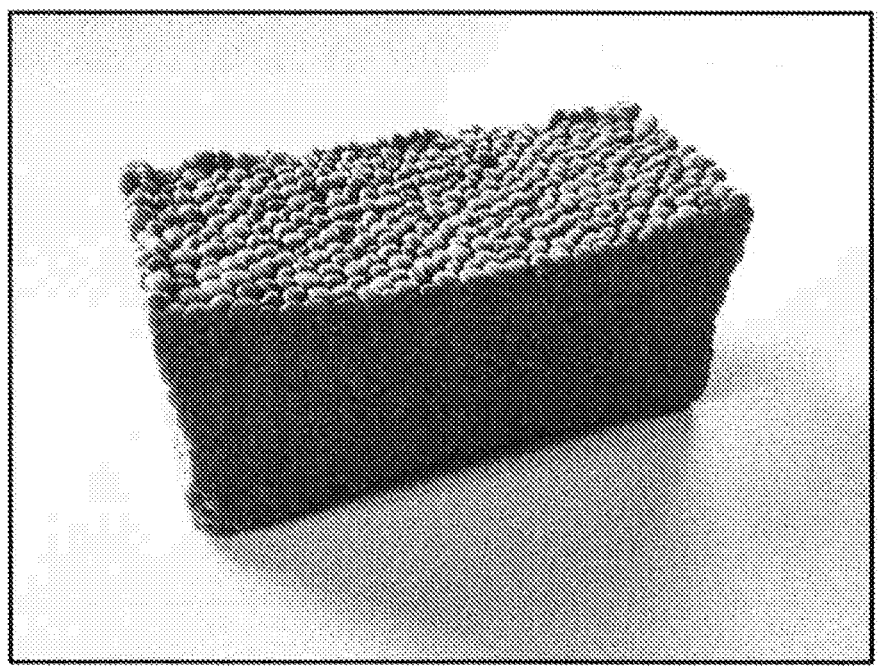

The problem with large or thick particle foam parts is that they heat up more in the middle than in the edge area, which can destroy the particle structure. FIG. 7h shows a particle foam part made of polylactate (PLA) with a thickness of about 5 cm, which has been heated with RF radiation over a period of 120 seconds. The RF radiation was applied with a frequency of 27.12 MHz and a voltage of 9 kV. Since the material itself absorbs the electromagnetic waves and is a poor heat conductor, the central area of the particle foam part heats up more strongly than the edge area, which is in contact with the molding tool 3 and is heated more slowly due to the relatively cool molding tool in comparison to the central part.

This can lead to a complete melting of the foam particles in the central area of the particle foam part (FIG. 7h). To avoid this, less energy can be used. FIG. 7e shows a corresponding particle foam part cut in the middle, which has been produced in the same way as the particle foam part shown in FIG. 7h, but here the RF radiation has only been applied for a period of 90 seconds. The central area of the particle foam part is homogeneously fused. The particles adhere to the edge area but could be welded together somewhat more strongly.

Figure 7J:
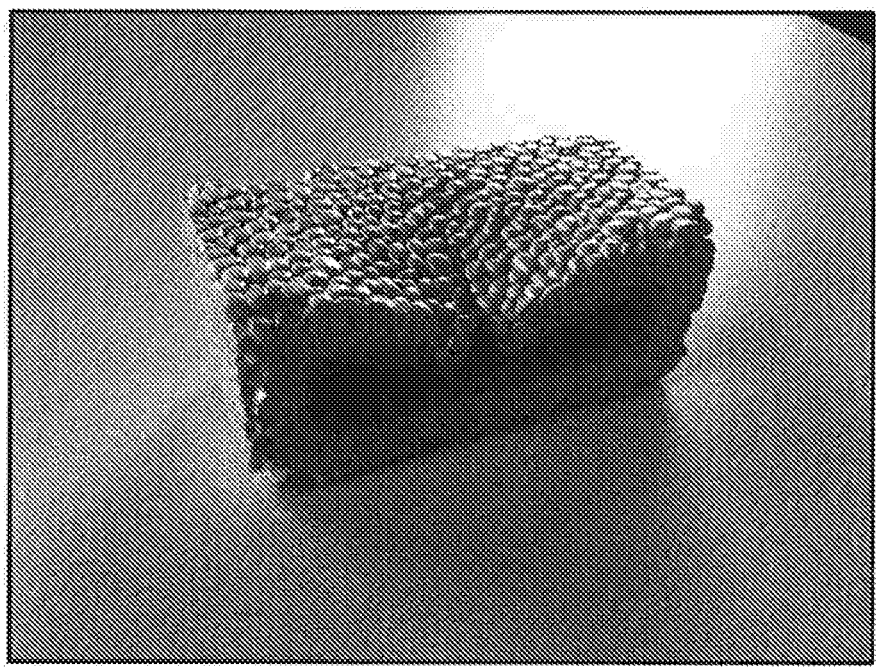
Figure 7K:
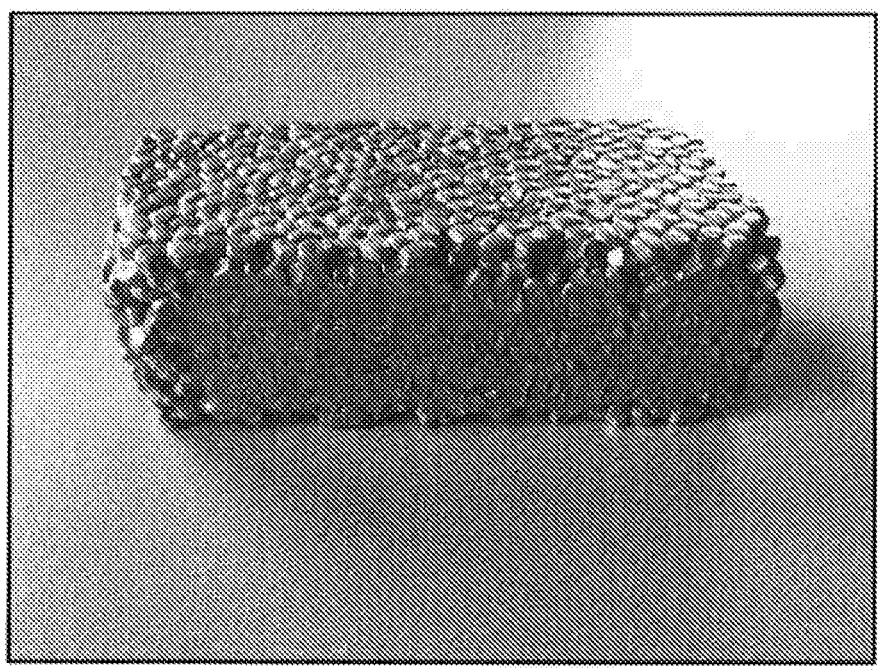

FIGS. 7j and 7k show corresponding illustrations of cut open particle foam parts made of polyethylene terephthalate (PET).

The RF radiation was applied here for a duration of 300 s with a frequency of 27.12 MHz, the voltage at the particle foam part shown in FIG. 7j was 10 kV and at the particle foam part shown in FIG. 7k 7.5 kV. The particle foam part shown in FIG. 7j has a destroyed central particle structure, whereas the central area of the particle foam part shown in FIG. 7k 15 homogeneously fused.

To avoid unequal heating of the central area and the edge area of a particle foam part, the molding tool 3 can be tempered and/or additional heat can be added to the foam particles in the edge area of molding chamber 14.

For tempering molding tool 3, molding halves 12, 13 can be designed with fluid channels through which a fluid is passed which is tempered to approximately the softening temperature of the material in molding chamber 14. Alternatively, or additionally, 3 heating wires can be provided for tempering the molding tools, as described above. As a result, no heat flows from the foam particles into molding 3 when the foam particles are heated, so that the foam particles are heated uniformly throughout the molding chamber 14.

It may even be appropriate to heat the molding tool 3 to a temperature slightly above the temperature set in the foam particles to fuse them by introducing RF radiation to ensure reliable welding of the particle foam part in the surface area. Tempering of molding tool 3 can also be carried out before welding with RF radiation.

Figure 3:
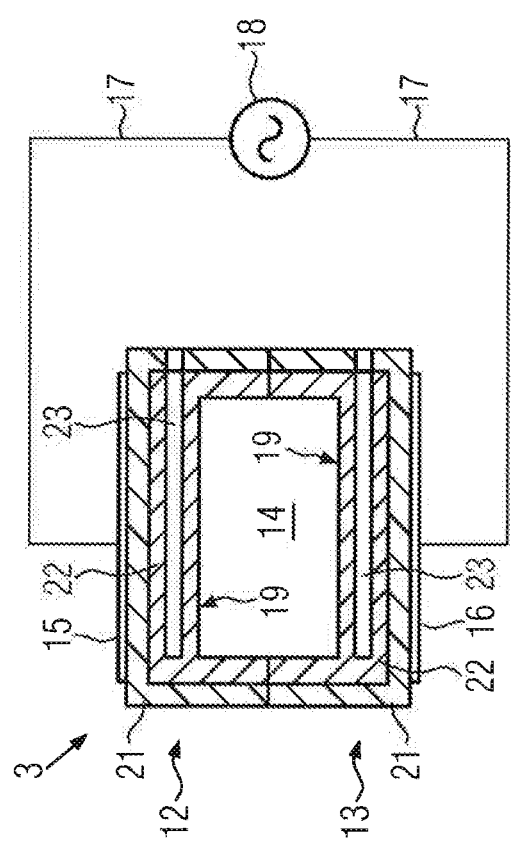

FIG. 3 shows another example of a mold 3, which in turn consists of two molding halves 12, 13. On flat outside surfaces 20 of the molding halves 12, 13, a flat capacitor plate 15, 16 is arranged in each case.

The molding halves 12, 13 are made of two parts: an outer non-porous shell wall 21 and an inner porous molded body 22.

The porous shaped bodies 22 define the inner delimiting surface 19 to define the molding chamber 14. On the sides facing away from the inner delimiting surface 19, the shaped bodies 22 are positively surrounded by the shell wall 21. The molding halves 12, 13 each have one or more channels 23, which each open at the shell wall and extend into the porous molded bodies 22 and end there. A hot medium can be introduced through channels 23 into the 10 molding halves 12, 13, which is distributed in the porous molded body 22 and partly enters the molding chamber 14. On the one hand this heats the foam particles in the edge area of molding chamber 14 directly through the medium and on the other hand the molding halves 12, 13, particularly their porous molded bodies 22, are also heated. Hot gases, especially hot air or steam, can be used as media.

To cool the molding tool or the particle foam part produced in it, it may also be advisable to introduce a cool medium into the channels 23 and thus into the molding chamber 14.

A medium is cool if it is colder than the mold half 12, 13 or colder than the particle foam part in mold chamber 14. This can accelerate the stabilization of the particle foam part.

Both the jacket wall and the shaped bodies 22 are each made of materials that are essentially transparent to RF radiation, such as polytetrafluoroethylene (PTFE), polyethylene, particularly UHMWPE, polyether ether ketone (PEEK). The shaped bodies 22 are produced, for example, by sintering a granulate from one of these materials.

Figure 4:
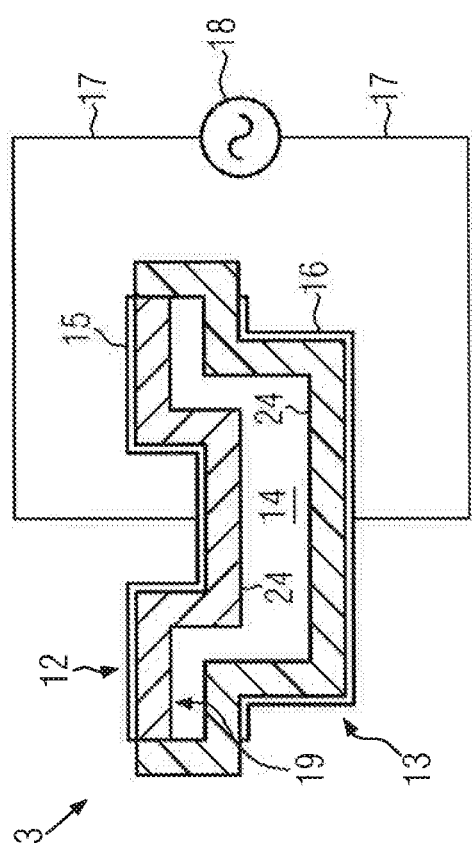

Another alternative to tempering the inner delimiting surfaces 19 of molding tool 3 is to provide the inner delimiting surfaces 19 with a layer of a material that is not transparent to RF radiation. This layer is referred to below as passive heating layer 24 (FIG. 4). The passive heating layer can be made of a temperature-stable material that is not transparent to RF radiation. Other suitable materials for such a passive heating layer 24 are ferrites. When RF radiation is applied, the passive heating layer 24 heats up and releases the heat to the adjacent foam particles.

Materials with a moderate loss factor, such as polyoxymethylene (POM) and polymethyl methacrylate (PMMA) can also be used as passive heating layer 24. Polyoxymethylene has a dielectric loss factor D of about 0.008 and polymethyl methacrylate of about 0.02. Due to the relatively low loss factor, these heating layers shall be provided with a certain thickness which is preferably at least 2 mm, in particular at least 2.5 mm and in particular at least 5 mm. Such a heating layer can also have a thickness of 10 mm or more. Such heating layers can also be formed as separate plates, which are arranged adjacent to the inner delimiting surfaces 19 of the form halves 12, 13.

The heating layer 24 can not only be provided at the delimiting surfaces 19 adjacent to the capacitor plates, but also at all delimiting surfaces 19 of the molding halves 12, 13, so that they completely surround the particle to be formed 15 foam part. The same also applies to the other heating and tempering devices mentioned above, such as temperature channels or heating wires.

The different possibilities for tempering the inner delimiting surfaces 19 listed above can also be used in combination in a molding tool.

The design examples of molding tools 3 explained above each have flat capacitor plates 15, 16. According to a further embodiment of the molding tools 3, these can be designed such that the capacitor plates 15, 16 are adapted to the shape of the particle foam part or of the mold space 14 to be produced. The design example shown in FIG. 4 shows two molding halves 12, 13, whose inner delimiting surfaces 19 define a stepped molding chamber 14. The outside surfaces 20 are matched to the contour of the corresponding inner delimiting surfaces 19 of the respective mold half 12, 13. In other words, the inner delimiting surfaces 19 are mapped onto the respective outside surfaces 20 of the molding halves 12, 13, whereby the molding tool 3, for example, is formed with a uniform thickness by which the outside surface 20 is offset from the inner delimiting surface 19. On the outside surface 20, preferably small structures of the inner delimiting surface 19 are smoothed.

On the outside surfaces 20 the capacitor plates 15, 16 are designed as an electrically conductive layer and have essentially the same shape or contour as the corresponding outside surface 20 of the respective molding half 12, 13.

As the capacitor plates in the molding tool are adapted to the particle foam parts to be produced or to the molding chamber 14, the distance between the opposing capacitor plates is approximately the same everywhere, whereby the distance between the opposing capacitor plates 15, 16 can be kept small, so that a high electrical 10 field strength is achieved at relatively low voltage.

Such a formal adaptation of the capacitor plates to the shape of the particle foam parts to be produced is particularly useful for shell-shaped particle foam parts. Such shell-shaped particle foam parts are for example boxes or spherical segment shaped shells. If such a case were to be formed between two flat capacitor plates, the distance between the capacitor plates would have to be so large that the entire case would have space between them. The distance between the two capacitor plates can only be slightly larger than wall thickness of the particle foam part. Such a formal adaptation of the capacitor plates therefore makes it possible to produce large-volume, particularly shell-shaped particle foam parts, while keeping the requirements for the voltage source low to provide a sufficient electrical field for welding the foam particles.

The problem with particle foam parts of different densities is that the areas with higher density absorb more heat than the areas with lower density. Areas with higher density are created, for example, in the cracking gap process, in which the two molding halves 12, 13, after they are already filled with foam particles, are pressed together a bit, whereby the foam particles contained therein are compressed. The thin areas of the molding chamber 14 are compressed more strongly relative to the thicker areas, since the displacement path is the same in all areas. This causes the foam particles in the thinner areas to be compressed more strongly.

Figure 5:
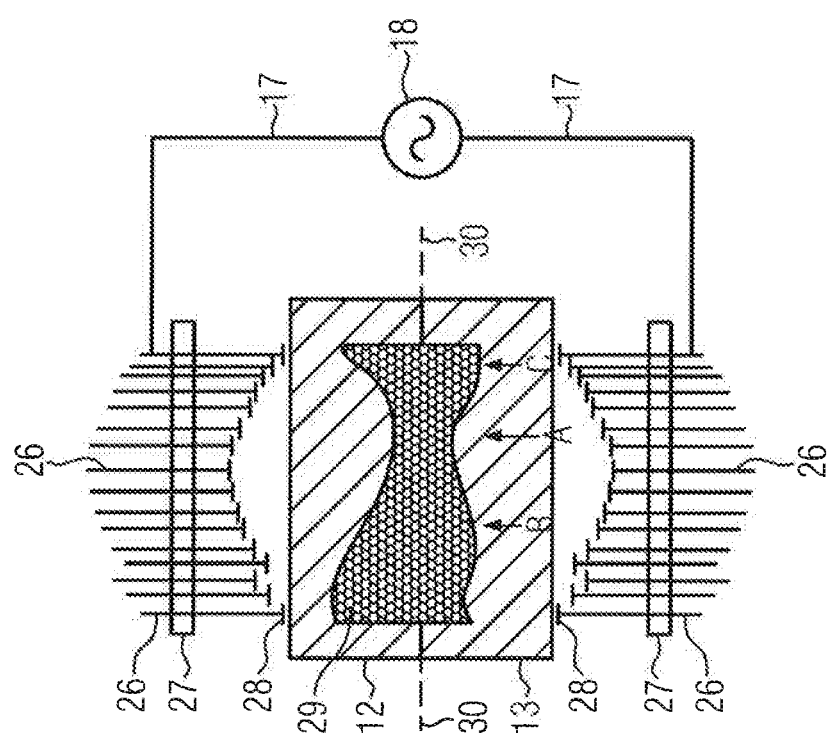

FIG. 5 shows an example of a molding tool 3 in which the capacitor plate 15, 16 are divided into several segments 25, whose distance to the molding chamber 14 is individually adjustable. In this design example, the segments of the capacitor plates 15, 16 are each small square plates, each coupled to a segment rod 26. The segment rods 26 are connected to the AC voltage source 18 and are in electrical contact with the respective, electrically conductive plates, which form the condensation tor plates 15, 16.

The segment rods 26 are slidably arranged in a holder 27, in which they can be fixed in a predetermined position. The bracket 27 can be designed in such a way that the segment rods 26 can be detachably fixed, whereby segment rods 26 and thus the capacitor plates 28 can be fixed in different positions. However, the brackets 27 can also be designed to fix the segment rods 26 once. Such supports 27 can, for example, be formed from a potting body which surrounds the segment rods 26 at least in certain areas and is poured out in a predetermined desired arrangement after the segment rods 26 and of the capacitor plates 28 have been arranged. Such once-fixable capacitor plates 15, 16 are mainly used for particle foam parts, which are produced very often or in large quantities and for which the corresponding tool is repeatedly used. The capacitor plates 15, 16 are then assigned the corresponding form halves 12, 13, with which they are used repeatedly.

The greater the distance between the sections of the capacitor plates 15, 16, the smaller the electrical field generated between the respective sections. Therefore, the capacitor plates 28, which are arranged to areas of the molding chamber 14, in which the foam particles are present in high density during the production of a particle foam part with a greater distance to the molding chamber than in the areas, in which the foam particles are present with low density. This can compensate for the areas with higher density absorbing more heat than the areas with lower density, so that the foam particles are heated uniformly in the mold chamber 14.

The molding tool 3 shown in FIG. 5 is a crack-gap mold filled with spaced molding halves 12, 13 with foam particles 29. After filling molding tool 3, the two halves of the molding tool 12, 13 are pressed together, whereby the foam particles 29 located in molding chamber 14 are compressed. The molding chamber 14 shown in FIG. 5 has different thicknesses in cross-section, whereby the thickness in area A is smaller than in areas B and C. As a result, the foam particles 29 are compressed more strongly in area A than in areas B and C, which gives them a higher density in area A than in areas B and C.

The foam particles 29 have a higher density in area A than in areas B and C. Therefore, the capacitor plates 28, which are arranged adjacent to the range A or point to range A, are arranged further away from a central plane 30 than the capacitor plates 28, which point to ranges B and C, respectively. The center plane 30 is arranged approximately centrally between the two capacitor plates 15, 16.

Since with the invention the foam particles are heated primarily by direct absorption of the RF radiation, i.e. that the heat is not or only to a small extent absorbed by a heat-transferring medium that absorbs the RF radiation and releases it to the foam particles, the temperature in the molding chamber cannot be controlled by parameters that act on a heat-transferring medium. In the state of the art, for example, it is known to use water as heat-transferring medium and to regulate the temperature in the molding chamber by adjusting the pressure. Due to the predominantly direct absorption, the foam particles can become as hot as desired and heat up to different degrees in different densities.

The basic aim is to heat the foam particles in the molding chamber as evenly as possible, in case they are made of the same material. By shaping the electric field with areas of different intensity or field strength by varying the distance of the capacitor plates 15, 16 to the molding chamber 14 or to the central plane 30, an even heating of the foam particles can be achieved in molding chamber 14, even if they are arranged there with different density. Therefore, it may be advantageous to provide capacitor plates 15, 16 with a non-planar configuration.

In the design example shown in FIG. 5, the capacitor plates 15, 16 are segment-shaped and made of capacitor plates 28, the position of which can be individually determined.

Figure 6:
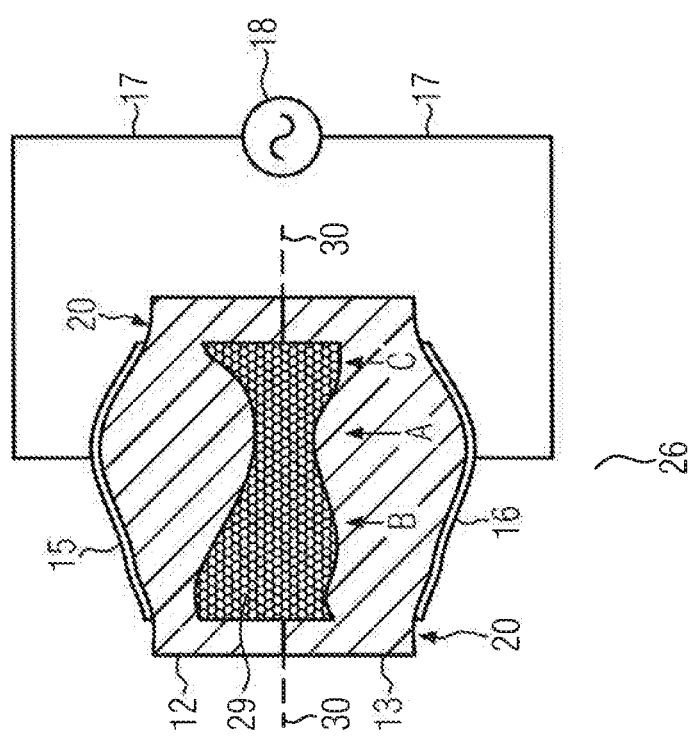

FIG. 6 shows another type of molding tool 3, in which the mold halves 12, 13 are formed with similar inner delimiting surfaces 19 as in the type shown in FIG. 5. This molding tool 3 is characterized by the fact that the outside surfaces 20 have a contoured shape so that that portions of the outside surface 20 are spaced at different distances from the central plane 30. The capacitor plates 15, 16 are mounted on the contoured outside surfaces 20, whereby their shape is adapted to the contoured outside surfaces 20.

The capacitor plates 15, 16 can, for example, be produced by an electrically conductive coating which is applied to the outside surfaces 20 of the molding halves 12, 13 is applied. The capacitor plates 15, 16 can also be designed as flexible sheet metal parts, which consist of an electrically well conducting metal or an electrically well conducting metal alloy and are adapted in the form to the outside surface 20 and are glued to the outside surfaces.

Also in this design, 30 as in the type shown in FIG. 5, sections of the capacitor plates 15, 16 are also spaced at different distances from the central plane 30 or from the molding chamber 14, whereby 14 areas with different electric field strengths are generated in the molding chamber. For areas 15 with higher compression of the foam particles 29 (A) the distance of the opposite sections of the capacitor plates 15, 16 is greater than for the series B, C, in which the compression of the foam particles 29 is lower.

The distance of the individual sections of the capacitor plates 15, 16 to the center plane 30 is approximately proportional to the density of the foam particles 29 in the ranges between the opposite sections of the capacitor plates 15. The proportionality factor differs between the different materials and depends on their absorption capacity of the RF radiation.

Molding tool 3 for producing large particle foam parts can have several separate segments of capacitor plates 15, 16. It is advisable that the capacitor plates are in no direction greater than a quarter of the wavelength of the RF radiation.

At a frequency of 27.12 MHz, the wavelength v is about 11 m. The maximum extension of the segments of the capacitor plates should therefore not exceed about 2.75 meters. Practice has shown that capacitor plates up to a size of about two meters generate a very uniform electric field at a frequency of 27.12 MHz.

If the capacitor plates are larger than γ/4 the radiation of the individual points of the capacitor plates is different and they no longer emit synchronously. For capacitor plates larger than R/4, it is advisable to provide distributed inductances on the capacitor plate, each forming an LC element.

This allows the synchronicity of the vibrations of the different sections of the capacitor plates to be restored. However, the provision of such LC elements is very complex. It may therefore be more expedient to use the capacitor plates into separate sections which are independently supplied with an AC voltage.

FIGS. 7a to 7k show pictures of particle foam parts cut to part, which have been welded with RF radiation without heat-transferring medium and without additional temperature control of the molding tool made of foam particles.

The following table shows the parameters of the voltage U, the duration t, the electrical loss factor D at 1 MHz and room temperature, the designation of the material and the reference to the figure.

| FIG. | Material | U(KV) | T(s) | D |
|---|---|---|---|---|
| 7a | ePEBA | 7.5 | 50 | 0.12 |
| 7b | oTPU | 7.5 | 25 | 1 0 0 1 1 1 0 2 1 2 |
| 7c | eTPU | 7.5 | 50 | 1 0 0 1 1 1 0 2 1 2 |
| 7d | eTPU | 9 | 30 | 0.112 |
| 7e | eTPU | 9 | 60 | 0.112 |
| 7f | PLA | 9 | 70 | <0.1 |
| 7g | PLA | 9 | 70 | <0.1 |
| 7h | PLA | 9 | 120 | <0.1 |
| 7i | PLA | 9 | 90 | <0.1 |
| 7j | PET | 10 | 300 | 0 014-0 048 |
| 7k | PET | 7.5 | 300 | 0.014-0.048 |

It has been shown that all materials ePEBA (polyether block amides), eTPU (expanded thermoplastic polyurethane), PLA (polylactate) and PET (polyethylene terephtalate) can have been well welded together by entry of heat by means of RF radiation alone. In the example shown in FIG. 7g, a particle foam part was produced from two differently dense foam particles. The foam particles in FIG. 7g above are dark-colored and have a lower density than the foam particles below, since the dark-colored foam particles are coarser-grained than the light-colored foam particles articles.

The above examples show that the inventive process can be used to process a wide variety of materials. PET is 100% recyclable. PET is obtained in large quantities at low cost from a recycling process. PET has so far been the preferred material for plastic beverage bottles. It is also very hard and allows the production of particle foam bodies with similar properties such as expanded polypropylene (epp) particle foam body.

PLA is also 100% recyclable, fully biodegradable and has mechanical properties such as expanded polystyrene (ePS) particle foam parts. Initial measurements have shown that PLA has a dielectric loss factor in the region of about 0.1 to 0.01. Exact measurements are not yet available. PLA has a softening temperature of approx. 100° C.

In comparison, the softening temperature of eTPU is about 125° C. to 130° C. and that of polyethyl enterephtalate about 200° C. to 260° C.

ePEBA is very light and highly elastic. It has similar properties to particle foam parts made of expanded thermoplastic polyurethane.

The invention can be summarized as follows:

The present invention pertains to a process for manufacturing a hybrid component such as a metal and plastic component. Foam particles are heated in a molding tool so that they are welded to the particle foam part. Heat is supplied to the foam particles by means of electromagnetic RF radiation. The foam particles are made of polyurethane, polyethylene block amide (PEBA), polylactate (PLA) or polyethylene terephthalate (PET).

REFERENCE NUMBERS

1. Device
2. Material Container
3. Molding tool
4. Line
5. Flooring
6. Compressed air pipe
7. Compressed air source
8. Propelling nozzle
9. Compressed air line
10. Filling injector
11. Compressed air line
12. Molding half
13. Molding half
14. Molding chamber
15. Capacitor plate 16. Capacitor plate
17. Electrical cable
18. AC voltage source
19. Delimiting surface (inside)
20. Outside surface
21. Jacket wall (non-porous)
22. Shaped body (porous)
23. Channel
24. Passive heating layer
25. Segment
26. Segment bar
27. Mounting
28. Capacitor plates
29. Foam particles
30. Center plane
31. Vacuum pump
32. Fan
33. Cooling fin
34. Heating wire
35. Current source

The invention claimed is:

1. Method for producing a particle foam part in which foam particles, formed from polyurethane, polylactate, polyethylene block amide (PEBA) or polyethylene terephthalate, are heated in a molding tool fusing the foam particles into the particle foam part, the foam particles being heated by electromagnetic radio frequency (RF) radiation.

2. Method according to claim 1,
wherein
the RF radiation has a frequency of at least 1 MHz and/or a maximum of 100 MHz.

3. Method according to claim 1 wherein
the foam particles consist of a uniform material.

4. Method according to claim 1,
wherein
the foam particles are compressed in the molding tool.

5. Method according to claim 1,
wherein
the temperature of the foam particles in the molding tool is measured,
the supply of the heat being controlled by means of electromagnetic RF radiation as a function of the measured temperature.

6. Method according to claim 1,
wherein
the surface of the molding tool defining a molding chamber is tempered.

7. Method according to claim 1,
wherein
a vacuum is applied to the molding tool so that gases and/or moisture contained therein are removed.

8. Method according to claim 1, the molding tool defining a molding chamber, wherein at least two capacitor plates are arranged adjacent to the molding chamber and are connected to an RF radiation source, wherein the RF radiation source is designed for emitting RF radiation.

9. Method according to claim 8,
wherein
the molding tool is formed from a material which is substantially transparent for electromagnetic RF radiation.

10. Method according to claim 8,
wherein the capacitor plates are designed with a flat surface.

11. Method according to claim 8,
wherein
the molding tool has different thicknesses in the region between the respective capacitor plates so that the molding chamber is limited by three-dimensionally contoured inner delimiting surfaces.

12. Method according to claim 8,
wherein
the molding tool is tempered in the region of an inner delimiting surface defining the molding chamber and/or for supplying a heating medium to the regions adjacent to the inner delimiting surfaces.

13. Method according to claim 12,
wherein
the molding tool comprises a porous molding body which forms at least a part of the inner delimiting surface and is communicatively connected to a device for supplying a heating fluid.

14. Method according to claim 12,
wherein
the molding tool has at least one channel for supplying or passing through a heating fluid.

15. A device for producing a particle foam part, comprising:
a material container holding loose polyurethane, polylactate, polyethylene block amide (PEBA) or polyethylene terephthalate foam particles,
a molding tool defining a molding chamber, wherein at least two capacitor plates are arranged adjacent to the molding chamber and are connected to an RF radiation source, wherein the RF radiation source is designed for emitting RF radiation having a frequency of less than 300 MHz to heat the foam particles supplied from the material container, and
the molding tool is provided at its inner delimiting surface with a passive heating layer made of a material which is not transparent to RF radiation and/or an electrical heating device.

16. Device according to claim 15,
wherein
the passive heating layer is formed from a ferrite.

17. Device according to claim 15,
wherein
the capacitor plates of the molding tool are adapted to the contour of the inner delimiting surfaces of the molding tool.

18. Apparatus for producing a particle foam part, comprising:
a material container holding loose polyurethane, polylactate, polyethylene block amide (PEBA) or polyethylene terephthalate foam particles,
a molding tool defining a molding chamber for receiving the foam particles from the material container, wherein at least two capacitor plates are arranged adjacent to the molding chamber and are connected to an RF radiation source, wherein the RF radiation source is designed for emitting RF radiation, and
wherein the capacitor plates have a three-dimensional contoured shape, a portion of the capacitor plates facing an area of the mold space in which in use the foam particles are more densified than in another area further away from the molding chamber than a portion of the capacitor plates that forms an area of the molding chamber in which the foam particles are less compressed.

19. Method according to claim 8,
wherein
the capacitor plates are each formed from a plurality of segments which can be set independently of one another at a distance from the molding chamber repeatedly or once.

20. Method according to claim 8,
wherein
the RF radiation source is designed to emit RF radiation, has a frequency of at least 1 MHz and/or a maximum of 100 MHz.

21. A method for producing a particle foam part, comprising:
providing polyurethane, polylactate, polyethylene block amide (PEBA) or polyethylene terephthalate foam particles in a molding tool; and
heating the foam particles with RF radiation to weld the particles, into the particle foam part, wherein the molding tool has a molding chamber and at least two capacitor plates are arranged adjacent to the molding chamber and are connected to an RF radiation source,
wherein the RF radiation source is designed for emitting RF radiation.

22. Method according to claim 1,
wherein the foam particles are formed from polylactate.

23. Method according to claim 1,
wherein the foam particles are formed from polyethylene block amide (PEBA) or polyethylene terephthalate.

24. Method according to claim 1,
wherein the RF radiation source is designed to emit RF radiation having a frequency of less than 300 MHz.

* * * * *